L. F. DELANEY.
MEANS FOR TURNING MOTOR VEHICLES.
APPLICATION FILED FEB. 4, 1921.
1,420,307.
Patented June 20, 1922.
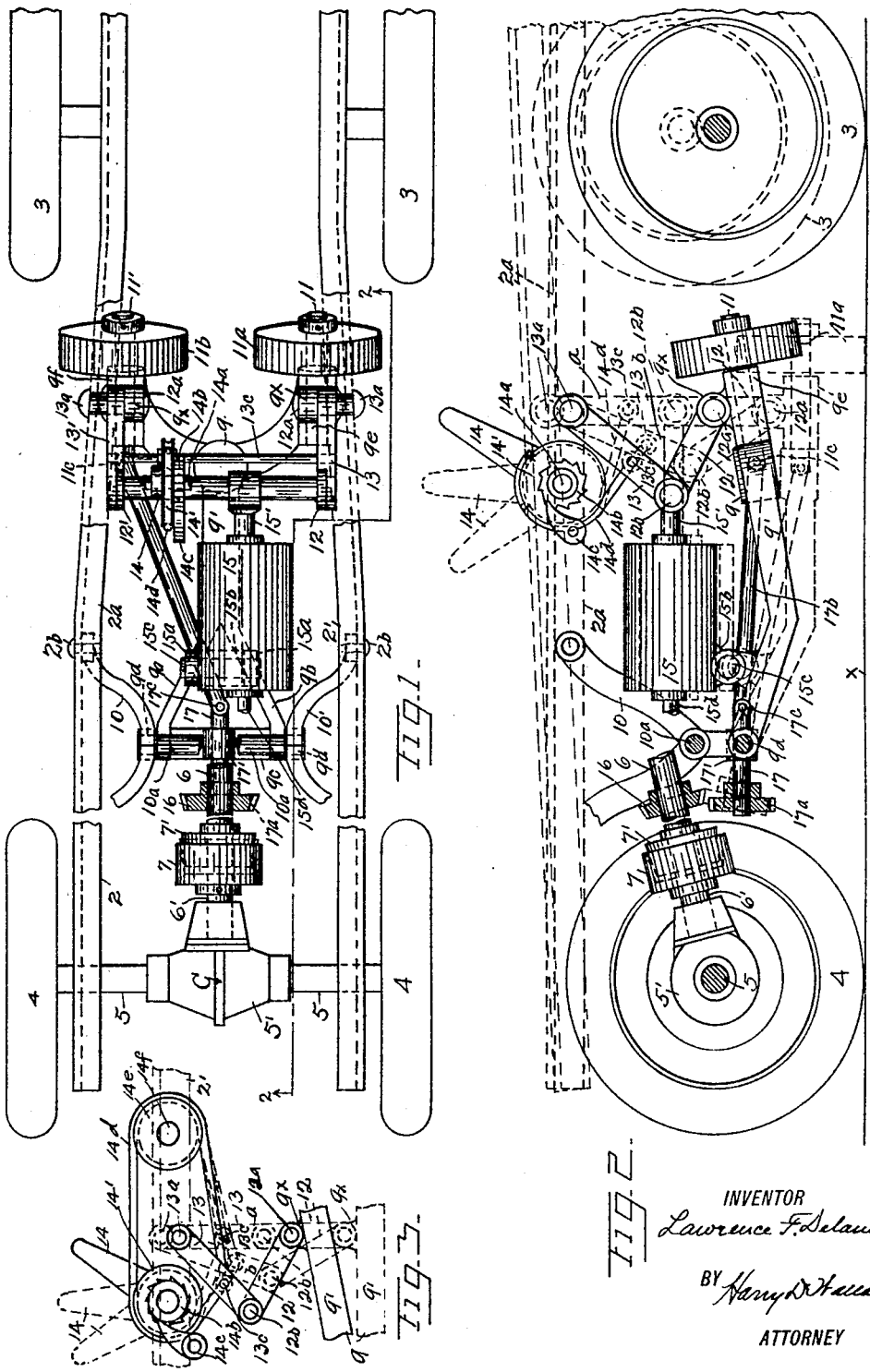
INVENTOR
Lawrence F. Delaney.
BY Harry D. Wallace
ATTORNEY

UNITED STATES PATENT OFFICE.

LAURENCE F. DELANEY, OF WATERTOWN, NEW YORK.

MEANS FOR TURNING MOTOR VEHICLES.

1,420,307. Specification of Letters Patent. Patented June 20, 1922.

Application filed February 4, 1921. Serial No. 442,449.

*To all whom it may concern:*

Be it known that I, LAURANCE F. DELANEY, a citizen of the United States, residing at Watertown, in the county of Jefferson and State of New York, have invented certain new and useful Improvements in Means for Turning Motor Vehicles, of which the following is a specification.

This invention relates to means for turning motor vehicles, and has for its object to provide a novel auxiliary mechanism, which is carried by the vehicle, and which is actuated by the power of the vehicle's motor, for turning a standing vehicle either to the right or the left, when the space for turning is too limited for performing the operation by means of the ordinary propelling mechanism. A further object is to provide novel and powerful means for lifting the forward wheels of the vehicle clear of the roadway, and for supporting the weight of the forward end of the vehicle, while the auxiliary mechanism is effecting the turning of the vehicle. And a further object is to provide novel and simple means for operatively connecting parts of the auxiliary mechanism with the main driving shaft of the vehicle, whereby the power of the vehicle's motor is utilized for turning the car around a center which corresponds substantially to the point of intersection of the longitudinal axis of the vehicle, with a line passing axially through the rear wheels.

I attain these objects by the means set forth in the detailed description which follows, and as illustrated by the accompanying drawings, in which—

Figure 1 is a top plan view of the chassis and running-gear of a motor vehicle; showing the disposition and arrangement of my invention. Fig. 2 is a side elevation of the same; showing by full and dotted lines the inoperative and operative positions of the turning mechanism. Fig. 3 is a reduced view; showing a modification of the truck and car operating means.

In the drawing, 2 represents the chassis of an automobile; 3—3 and 4—4 are respectively the front and rear wheels of the vehicle; 5 is the rear axle; and 5′ is the usual differential, the latter being driven by a two-part shaft 6—6′, which derives its power from the motor or engine (not shown). The corresponding ends of the shaft 6—6′ respectively support members 7—7′ of the usual clutch, the latter being shown opened or released in the several views, indicating that the vehicle is standing still. The shaft 6′ connects with and drives the differential in the usual manner. The shaft 6 preferably connects with and is controlled by the usual transmission gearing (not shown), which determines the direction of rotation of the shaft, in a well-known manner. In the present case the transmission gears are utilized for determining the direction the vehicle is to be turned.

Heretofore, the turning of automobiles and like self-propelled vehicles has been a source of more or less trouble and inconvenience, due chiefly to the long wheel-base and the absence of the fifth-wheel, which enables the ordinary wagons and buggies to be turned in relatively small arcs or circles. The motor vehicles when being turned, require a clear-way for their broad arcs and circles, and when the turning spaces are contracted or crowded by other vehicles, the usual practice is to run the cars forward, then reverse, and then run them forward again, thus repeating the "tacking" movements until the vehicle is turned. It is a particular object of the present invention to provide novel and effective means for turning a vehicle around a center, as C (in Fig. 1), which substantially coincides with the vertical axis of the differential 5′, whereby a complete revolution of the vehicle may be effected within a circle whose diameter is little greater than the length of the vehicle, and whereby the forward end of the automobile may be readily and quickly swung away from a curb or like obstruction, in an arc as great as 90 degrees, for extricating the car from a line or group of closely parked vehicles, thereby saving time, and avoiding collisions or injury to the cars. The turning of the vehicle being effected while its front wheels are elevated from the roadway, and wherein the rear wheels describe a circle whose diameter is substantially equal to the spacing of the said wheels. In this way the turning operation may be accomplished without any lengthwise movement of the vehicle. My novel turning mechanism will now be described:

9 represents generally a truck, comprising a frame 9′, the opposite ends of which are forked. The rear fork of the frame comprises arms 9ᵃ—9ᵇ whose free ends are tied together by a transverse bar 9ᶜ. These arms are of equal length, and are provided with alining perforations to receive pins 9ᵈ, which pivotally connect said arms to corresponding lugs that depend from similar brackets 10—10′, the latter being rigidly secured to the opposite chassis members 2′—2ᵃ, by pins or bolts 2ᵇ. The brackets are tied together by a rod 10ᵃ. The forward end of the frame 9′ comprises similar arms 9ᵉ and 9ᶠ. These are bored out longitudinally to receive shafts or journals 11—11′ upon which are mounted similar wheels 11ᵃ—11ᵇ, the axes of said wheels being at right angles to the axes of the vehicle wheels 3 and 4. The shaft 11 is preferably rigid in the arm 9ᵉ, while the shaft 11′ is preferably rigid in the wheel 11ᵇ, and is journalled in the arm 9ᶠ. The arms 9ᵉ and 9ᶠ are provided with similar integral perforated lugs 9ˣ, the said perforations being in axial alinement, and to the said lugs are pivoted the corresponding ends of links 12—12′ by pins 12ᵃ. 13—13′ represent similar but slightly longer links, the lower ends of which are pivoted to the opposite ends of the links 12—12′ by a rod 12ᵇ, while the upper ends of the longer links are pivoted to the chassis members 2′—2ᵃ by pins 13ᵃ. The links 12—13 and 12′—13′ comprise spaced toggles which are operated as one part, for raising and lowering the truck 9, as well as for raising the front end of the vehicle, as shown by the full and dotted lines in Fig. 2. The lowering and raising of the truck 9, is effected partially by gravity and partially by a manually operable lever 14, which preferably projects through the floor of the vehicle within convenient reach of the driver. The lever 14 is rigidly attached to a sheave 14′, which may be pivotally supported by the chassis by means of a shaft 14ᵃ. To one face of the sheave 14′ is fixed a rachet wheel 14ᵇ, which is engaged by a pawl 14ᶜ, for holding the lever and related parts in the various adjusted positions. To the sheave 14′ is secured one end of a flexible cable or chain 14ᵈ, the other end of said cable being secured to a rod 13ᶜ, which extends between the toggles. The swinging of the lever 14 forwardly to the full line position, shown in Fig. 2, winds up the cable 14ᵈ, and pulls the toggles rearwardly from the dotted alining position a, to the full line angular position, for lifting the forward end of the truck 9 away from the roadway x. The pawl 14ᶜ then holds the truck and related parts in the fully raised position. The disengagement of the pawl 14ᶜ allows the lever 14 to swing rearwardly to the first dotted position. This unwinds the cable 14ᵈ sufficiently to permit the forward end of the truck 9 to gravitate until the wheels 11ᵃ—11ᵇ rest upon the roadway x, the same as the vehicle wheels 3—3. This operation shifts the toggle links from the full line position to the dotted position b (in Fig. 2). The jacking-up or lifting of the forward end of the vehicle may be accomplished by means of a fluid pressure cylinder 15 and its piston rod 15′, the outer end of the latter being pivotally connected to the rod 12ᵇ. The pressure for operating the piston rod 15′ may be derived from any suitable source (not shown), and may be carried into cylinder 15 by a pipe 15ᵈ. The charging of the cylinder 15 drives the piston 15′ forwardly for moving the toggles from the dotted position b to the alining position a. This effects the lifting of the forward vehicle wheels 3—3 from the full, to the dotted line position, shown at the right in Fig. 2. As the links of the toggles are moved into alinement they unwind more of the cable 14ᵈ, which swings the lever 14 still further towards the rear, as indicated by the second dotted position shown in Fig. 2. The air pressure should be sustained during the whole of the turning movement of the vehicle, after which the pressure may be released, in a well-known manner, for allowing the driver to swing the lever 14 back to its full line position, for "breaking" the toggles and lifting the truck wheels 11ᵃ—11ᵇ upwardly clear of the roadway x.

The turning of the vehicle after the forward end has been lifted clear of the ground is accomplished by the power of the engine, by the following means: 16 represents a gear which is rigidly mounted on the part 6 of the main driving shaft just ahead of the clutch 7, and preferably rearwardly of the transmission gears (not shown). 17 represents a shaft which is journalled in a bearing 17′ supported by the tie-bar 9ᵉ. The rear end of the shaft 17 is fitted with a gear 17ᵃ, which is positioned directly beneath the gear 16, the gear 17ᵃ being normally held out of mesh with the gear 16, while the truck 9 is in its raised position, shown by full lines in Fig. 2. The lowering of the forward end of truck 9 effects the meshing of the gears 16 and 17ᵃ as shown by the dotted lines, in Fig. 2. The shaft 17 connects with and drives the shaft 11′ and the wheel 11ᵇ by means of an angular shaft 17ᵇ, and universal joints 11ᶜ and 17ᶜ.

During all of the turning operation, the clutch 7—7′ should be in full release, as shown in the drawings, so as to prevent the driving of the rear wheels 4 by the motor until the car is ready to be propelled in the usual manner.

Briefly, the operation of my vehicle turning mechanism is as follows:

The driver in stopping the vehicle throws out the clutch 7—7′, as shown in the drawing, and stops the motor. He next sets the transmission gears, as explained, for rotating the main shaft 6 in the proper direction for turning the vehicle (to the left or right). He then releases the pawl 14ᶜ, and pulls the lever 14 rearwardly from full line to dotted line position, shown in Fig. 2. This allows the truck 9 to gravitate until its wheels come to rest on the roadway. This shifts the toggles from the full line to the dotted line position $b$ (in Fig. 2). The cylinder 15 is next charged with air-pressure, which drives the piston rod 15' outwardly, and forces the toggles from the dotted position $b$, to the dotted position $a$. The wheels 11ᵃ—11ᵇ being in firm engagement with the ground, serve as a fulcrum for the toggles 12—13, and when the latter are moved into the alining position, they lift the forward end of the vehicle upwardly clear of the ground. The air pressure then holds the parts in the last named position. The lowering of the forward end of the truck 9 effects the meshing of the gears 16 and 17ᵃ. The driver then starts the motor which drives the shafts 6, 17, 17ᵇ, 11', and the wheel 11ᵇ, and turns or swings the vehicle on the center C, which is virtually the vertical axis of the differential 5', and in effecting the said turning the rear wheels 4 travel around the said axis in a circle whose diameter is substantially equal to the spacing of said wheels as described. When the vehicle is turned to the desired extent, the motor is again stopped, the air pressure in the cylinder 15 is released, and the driver moves the lever 14 forwardly from the second to the first dotted position for lowering the front end of the vehicle. He then moves the lever 14 to the full line position, as shown in Fig. 2. These operations "breaks" the toggles 12—13, and then lifts the forward end of the truck 9 away from the roadway, and at the same time effects the unmeshing of the gears 16—17ᵃ. The motor may then be started, and the clutch and transmission may be operated in the usual manner for propelling the car.

In Fig. 3, I have shown a modification of the means for operating the toggles 12—13, which dispenses with the employment of the fluid pressure cylinder 15, and consists of an extra sheave 14ᵉ, which is pivotally supported by a pin 14ᶠ, and the cable or chain 14ᵈ is lengthened to engage both of the sheaves. The ends of the cable are both connected to the rod 13ᶜ, which ties the links 13—13' together. In practice, the operator first disengages the pawl 14ᶜ from the ratchet 14ᵇ, then by moving of the lever 14 rearwardly from the full line to the dotted position (Fig. 3), operates the cable 14ᵈ in the direction for shifting the toggles from the dotted position $b$, to the dotted alining position $a$. This latter operation lifts the forward end of the vehicle to the same extent as when operated by the piston rod 15', shown in the other views. To lower the forward end of the vehicle, the driver moves the lever 14 forwardly from the second to the first dotted position. This causes the cable 14ᵈ to travel in the opposite direction, for "breaking" the toggles and moving them back to the dotted position $b$. The final movement of the lever 14 to the full line position, effects the lifting of the forward end of the truck 9 from the dotted, to the full line position, shown in Figs. 2 and 3. The pawl 14ᶜ should then be thrown into engagement with the ratchet, 14ᵇ, for holding the parts in the last described positions.

The cylinder 15 is preferably supported by the truck frame 9', which is provided with upwardly facing perforated lugs 15ᵃ between which a corresponding lug 15ᵇ carried by the cylinder is disposed and through all of said lugs is driven a pivot pin 15ᶜ. By this construction and arrangement, the cylinder is allowed an oscillating movement in a vertical plane to correspond to the variable movements of the toggle rod 12ᵇ, as shown in Fig. 2.

Having thus described my invention, what I claim as new and desire to secure by Letters Patent, is—

1. The combination with the chassis and the propelling shaft of a motor vehicle, of a wheel-truck disposed beneath said chassis, the rear end of said truck being pivoted, and the forward end of said truck being movable in a vertical plane, toggles connecting the forward end of said truck with said chassis, manually controlled means for moving the wheels of said truck towards and away from the roadway, means for operating said toggles for "jacking up" the forward end of the vehicle, and means for operatively connecting the wheels of said truck with said propelling shaft, for rotating said truck wheels.

2. The combination with the running gear and the propelling shaft of a motor vehicle, of an auxiliary mechanism comprising a frame, one end of which is pivoted beneath the body of the vehicle, toggles connecting the forward end of the said frame with the body of the vehicle adapted to raise and lower said frame, and also to raise the forward wheels of the vehicle away from the roadway, wheels carried by the forward end of said frame whose axes are at right angles to the axes of the vehicle wheels, means for operatively connecting one of the wheels of said frame with said propelling shaft, whereby the power which drives said propelling shaft also rotates the wheels of said frame, for turning the vehicle to the right or to the left.

3. The combination with the running gear and the propelling shaft of a motor vehicle, of a truck disposed between the front and rear wheels and beneath the frame of the vehicle, one end of said truck supporting a plurality of wheels, the opposite end of said truck being pivotally supported by the frame of the vehicle, whereby the wheels of said truck may be moved in a vertical plane towards and away from the roadway, toggles interposed between the free end of said truck and the vehicle frame, manually operable means adapted for raising and lowering the free end of said truck, fluid pressure means for operating said toggles for lifting the forward end of the vehicle, and means for driving the wheels of said truck for turning the vehicle in a circular path whose axis is located in the line of the axis of the rear wheels of the vehicle.

4. In means for turning a motionless motor vehicle to the right or left, the combination with the chassis and the propelling shaft, of a two-wheel truck pivotally supported beneath the chassis, the wheel-end of said truck movable in a vertical plane towards and away from the roadway, toggles connecting the wheel-end of the truck with the chassis, adapted for raising and lowering the said truck, rockable means for operating said toggle during the raising and lowering of said truck, a pressure device for operating said toggles for lifting the forward end of the vehicle when the wheels of said truck are in engagement with the roadway, means for operatively connecting the wheels of said truck with said propelling shaft for turning the vehicle while its forward end is elevated, and means for "breaking" said toggles for effecting first the lowering of the forward end of the vehicle and then for lifting the wheel-end of said truck away from the roadway.

In testimony whereof I affix my signature.

LAURENCE F. DELANEY.